March 25, 1958 E. KARWAT 2,827,776
PROCESS FOR SEPARATING A COMPRESSED GAS MIXTURE
Filed May 20, 1955
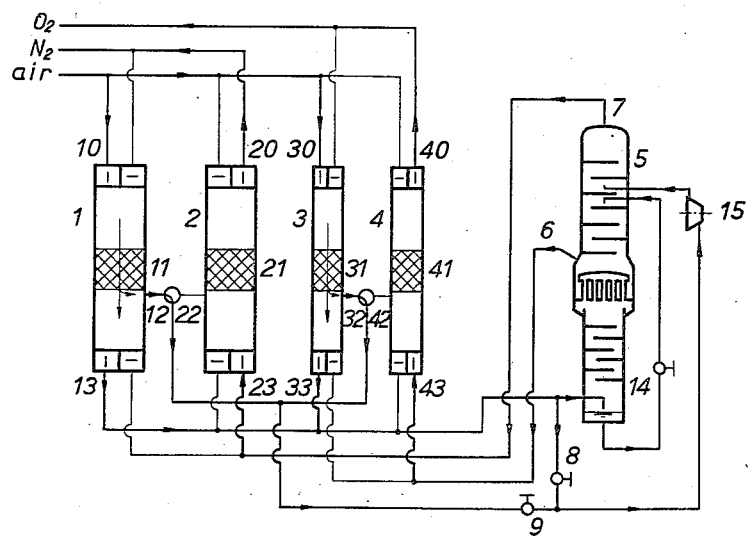

United States Patent Office 2,827,776
Patented Mar. 25, 1958

2,827,776

PROCESS FOR SEPARATING A COMPRESSED GAS MIXTURE

Ernst Karwat, Pullach, near Munich, Germany, assignor to Gesellschaft fur Linde's Eismaschinen Aktiengesellschaft, Munich, Germany Application May 20, 1955, Serial No. 509,731
In Germany November 10, 1949

Public Law 619, August 23, 1954
Patent expires November 10, 1969

4 Claims. (Cl. 62—175.5)

This invention relates to a process for separating a compressed gas mixture.

In the separation of a gas mixture by pressure and cooling, the separation of the mixture is preceded by the process steps of purification and cooling. The steps of cooling and purification are simultaneously carried out in cold accumulators which are adapted to be changed over, or a counter-current heat-exchanger of interchangeable cross-section. The re-vaporisation of separated condensates at the cold end of the heat-exchangers is impeded if equal quantites of the hot, unseparated gas mixture and the cold separation products are fed to the exchangers. The reason for this is that the compressed gas mixture especially at low temperatures, has a substantially greater specific heat than the uncompressed products of separation. Consequently, the temperature difference between the products of equal weight entering and leaving the exchangers is substantially greater at the cold ends than at the other parts of the exchangers. Thus the re-vaporisation of separated condensates is impeded even if the ratio between the volumes of the gases entering and leaving is that which is required in order to effect re-vaporisation at medium or high temperature. In the art of gas separation this is remedied in various ways, for example by not introducing part of the gas mixture to be separated through the cold accumulators, and by discharging its products of separation through the accumulators. One example of such a method is the high-pressure Linde-Frankl process of air separation. The air is not introduced through the cold accumulators, but one part of its products of separation passes out through the regenerators. However, the temperature difference between the air and the separation products at the warm end of the regenerators then increases, which causes cold losses. Another known method resides in feeding the whole of the gas mixture to be separated to the heat-exchangers, in branching off an incompletely purified, cooled part before it reaches the coldest zone of the exchangers and in completely cooling and purifying this part in counter-current heat exchange with the cold gas mixture. The refrigerated impurities are deposited in one counter-current heat-exchanger and the exchanger is freed from the deposits by heating. Meanwhile, the branched-off gas current is cooled and purified in a second counter-current exchanger. These counter-current exchangers are large and costly and frequent changing thereof is necessary. Furthermore, the temperature of the gas current cooled therein fluctuates like that of the component current, to the detriment of its further use.

It is an object of the present invention to provide a new advantageous way of solving this problem. The process according to the invention for separating a compressed gas mixture comprises the steps of successively contacting the mixture with an adsorber in cold accumulators to free said mixture practically completely from impurities dividing the mixture into a main stream and a partial stream, completely cooling the main stream in the cold accumulators and separating both streams in a suitable separation apparatus and reheating the separation products in the cold accumulator, to desorb the adsorption medium.

The result of this process is that, at the lower cold ends of the cold accumulators, a quantity of gas is heated which is greater than that which is cooled to the extent of the partial stream branched off, which leads to equilibrium of the cold economy of the cold accumulators at their warm ends also and ensures revaporisation of the condensates separated off. At the same time this object is achieved with a simplicity, both of the apparatus and of the operational steps, which cannot be achieved by any other method. It is known per se to provide in the cold accumulators, in addition to the cold-accumulating masses, an adsorption medium, to charge it with the impurities of a gas mixture and to desorb it with the discharged separation products by alternately changing over the operation of the cold accumulator. The charging of the adsorption medium, for example a gel, then fluctuates on the side on which the impure gas flows in between saturation and charging values slightly below saturation, whilst, on the side on which the air that is thus purified flows out, the charging of the gel fluctuates between very small and still smaller values.

For carrying out the process, the gel is spread over the cross-section of the regenerator above the branch point of the gas streams. The branch point is selected for the desired balancing of the water value of the gases flowing in and out in the lower part of the regenerator to be achieved.

For a better understanding of the invention and to show how the same may be carried into effect, reference will now be made to the accompanying drawing which shows diagrammatically an air-separation plant comprising four cold accumulators 1 to 4 for the heat-exchange of air, which enters through the accumulators 1 and 3 with its products of separation, oxygen and nitrogen, which flow away through the accumulators 2 and 4. The accumulators are charged with a filling mass on which water condenses and is re-vaporised, and are provided with chambers 11, 21, 31 and 41 indicated by hatching containing an adsorption medium (silica gel or alumina gel) which takes up carbon dioxide and acetylene from the air. Below the layer of adsorption medium, part of the air is laterally withdrawn from the regenerator at 12, 32 and the main quantity of air is cooled completely to low temperatures in the cold accumulators and then passed through conduits 13 and 33 respectively for initial separation in the pressure column 14 of an air-separation apparatus. The warm partial stream guided through valve 9, is delivered, if desired in admixture with cold air taken from the main stream after the regenerators, through a valve 8, to a turbine 15 for expansion in which work is performed and cold yielded, and is then blown into the upper column 5 of the air-separation apparatus. The separation products nitrogen and oxygen are led out by way of conduits 7 and 6 respectively through the regenerators 2 and 4 respectively, the impurities of the air being desorbed by the gel and vaporised by the filling mass in the accumulators. A quantity of gas now flows out through the cold part of the accumulators, at the place where the difference in quantity between compressed air and expanded gases is especially large, the quantity of gas being substantially greater than that which flows in. The difference is the quantity of the partial stream withdrawn in the warm condition. Its quantity is dimensioned in accordance with the requirements of the separation. In order to produce 80% to 90% oxygen, a greater partial stream can be blown into the upper column than for the production of 98% oxygen.

The process of the invention is applicable to gas mixtures other than air and to impurities of the gas mixture other than carbon dioxide and acetylene. The process of the invention may also be employed in the purification of combustible gases which are cooled to low temperatures by means of cold accumulators for the removal of all impurities detrimental to the proposed syntheses. For the separation of the gas mixture, it is possible within the scope of the invention to employ, instead of the rectification mentioned in the examples, other methods, for example a separation process with washing agents.

I claim:

1. Process for the separation of a compressed gas mixture, comprising the steps of freeing said mixture of water vapour by progressively cooling the same in reversible heat-exchange with the cold separation products obtained from said mixture, substantially completely removing gaseous impurities from said mixture by adsorption during the progressive cooling of the gas mixture, withdrawing part of the purified mixture, expanding said part and feeding the expanded gases to the low-pressure stage of a two-stage separating process, further cooling the remainder of said cooled and purified mixture in said reversible heat-exchange, and feeding part of the further cooled gases to the high-pressure stage of said separating process, controllably adjusting the temperature of the withdrawn part of the purified mixture before the expansion of the same by adding colder pure gas thereto, obtaining from said expanded and said further cooled gases in said separator the separation products of said mixture, and feeding the cold separation products from said separator to said reversible heat-exchange.

2. A process according to claim 1, and further comprising the steps of diverting a portion of the fully cooled remainder of said gas mixture and combining said portion with the partially cooled gases before the expansion thereof as required by the heat-balance of the separation.

3. A process according to claim 1, wherein said gas mixture to be separated is air, the separation products consist essentially of oxygen and nitrogen, the gaseous impurities consist essentially of carbon dioxide and of low-boiling gases, and the adsorption material for the removal of said impurities consists essentially of a gel.

4. A process as claimed in claim 1 comprising utilizing at least one of the separation products to regenerate the adsorption material used in the adsorption step by passing the separation product through the adsorption material.

References Cited in the file of this patent

UNITED STATES PATENTS

| | | |
|---|---|---|
| 2,337,474 | Kornemann et al. | Dec. 21, 1943 |
| 2,584,381 | Dodge | Feb. 5, 1952 |
| 2,617,275 | Goff et al. | Nov. 11, 1952 |
| 2,650,481 | Cooper | Sept. 1, 1953 |
| 2,777,299 | Skaperdas | Jan. 15, 1956 |

FOREIGN PATENTS

| | | |
|---|---|---|
| 497,662 | Belgium | Feb. 19, 1951 |

(Corresponding U. S. 2,699,047, Jan. 11, 1955)